United States Patent
Peters et al.

(10) Patent No.: US 9,390,323 B1
(45) Date of Patent: Jul. 12, 2016

(54) RECOMMENDING SITES THROUGH METADATA ANALYSIS

(71) Applicant: International Business Machines Corporation, Armonk, NY (US)

(72) Inventors: Michael T. Peters, Durham, NC (US); Dana L. Price, Durham, NC (US); James C. Riordan, Research Triangle Park, NC (US); Belinda M. Vennam, Durham, NC (US); Ramratan Vennam, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/714,424

(22) Filed: May 18, 2015

(51) Int. Cl.
*G06K 9/00* (2006.01)
*G06K 9/62* (2006.01)
*G01S 19/42* (2010.01)
*G06Q 30/00* (2012.01)

(52) U.S. Cl.
CPC ............ *G06K 9/00476* (2013.01); *G01S 19/42* (2013.01); *G06K 9/6218* (2013.01)

(58) Field of Classification Search
USPC ......... 382/100, 103, 106, 112–113, 155, 168, 382/173, 181, 189, 206, 209, 232, 254, 276, 382/286–291, 294, 305, 312; 455/418; 707/738; 705/14.67; 348/239; 257/E21.528
See application file for complete search history.

(56) References Cited

U.S. PATENT DOCUMENTS

| | | | |
|---|---|---|---|
| 7,474,959 B2 | 1/2009 | Singh | |
| 7,479,459 B2 * | 1/2009 | Kofuji | H01J 37/32935 257/E21.528 |
| 8,144,232 B2 * | 3/2012 | Larson | H04N 5/23293 348/239 |
| 8,150,617 B2 | 4/2012 | Manber et al. | |
| 8,407,225 B2 * | 3/2013 | Lahcanski | G06F 17/30241 707/738 |
| 8,543,586 B2 * | 9/2013 | Glachant | G06F 17/30241 382/100 |
| 9,014,726 B1 * | 4/2015 | Foster | H04W 4/02 455/418 |
| 2009/0222432 A1 | 9/2009 | Ratnakar | |
| 2010/0076968 A1 | 3/2010 | Boyns et al. | |
| 2011/0184949 A1 | 7/2011 | Luo | |
| 2012/0066219 A1 | 3/2012 | Naaman et al. | |
| 2012/0131028 A1 | 5/2012 | Glachant et al. | |
| 2012/0239506 A1 * | 9/2012 | Saunders | G06Q 30/02 705/14.67 |
| 2013/0039540 A1 | 2/2013 | Takami et al. | |
| 2013/0040660 A1 | 2/2013 | Fisher et al. | |
| 2013/0111512 A1 | 5/2013 | Scellato et al. | |

OTHER PUBLICATIONS

Google Inc., "Google Now cards", retrieved from <https://web.archive.org/web/201407170044956/https://support.google.com/websearch/answer/2839499?hl=en> on Feb. 19, 2015, 2014, 2 pages, Google, Inc.
Google Inc., "Google Maps API", 2009, 15 pages, Google Inc.

* cited by examiner

*Primary Examiner* — Seyed Azarian
(74) *Attorney, Agent, or Firm* — Jordan IP Law, LLC

(57) ABSTRACT

Methods, systems, and computer program products relate to recommending sites including identifying a location associated with a computing device, analyzing metadata of geotagged image data, the image data including blocked image data, and suggesting sites near the identified location based on the results of the metadata analysis.

21 Claims, 2 Drawing Sheets

RECOMMENDING SITES THROUGH METADATA ANALYSIS

BACKGROUND

Embodiments of the present invention generally relate to generating automated recommendations. More particularly, embodiments relate to recommending sites through metadata analysis.

When a user of an electronic device travels on a defined route, the user may typically know the parameters of the defined route based on a predetermined starting point and destination with intermediate paths selected by, for example, a computer navigation program. There may be interesting sites along the route, however, that are not known by the computer navigation program. In such a case, the user may typically also be unaware of the interesting sites. As a result, the user experience may be negatively impacted.

BRIEF SUMMARY

Embodiments may include a method to recommend sites including identifying a location associated with a computing device, analyzing metadata of geotagged image data, the image data including blocked image data, wherein analyzing metadata includes performing a clustering analysis of the metadata and the geotagged image data includes GPS (Global Positioning System) coordinates, and recommending sites near the identified location based on the results of the metadata analysis.

Embodiments may also include a computer program product to recommend sites, the computer program product including a computer readable storage medium having program instructions embodied therewith, the program instructions executable by a computer to cause the computer to identify a location associated with the computer, analyze metadata of geotagged image data, the image data including blocked image data, wherein analyzing metadata includes performing a clustering analysis of the metadata and the geotagged image data includes GPS coordinates, and recommend sites near the identified location based on the results of the metadata analysis.

Embodiments may also include a computer program product to recommend sites including a GPS device to identify a location associated with the computing system, a processor to analyze metadata of geotagged image data, the image data including blocked image data, and recommending sites near the identified location based on the results of the metadata analysis.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
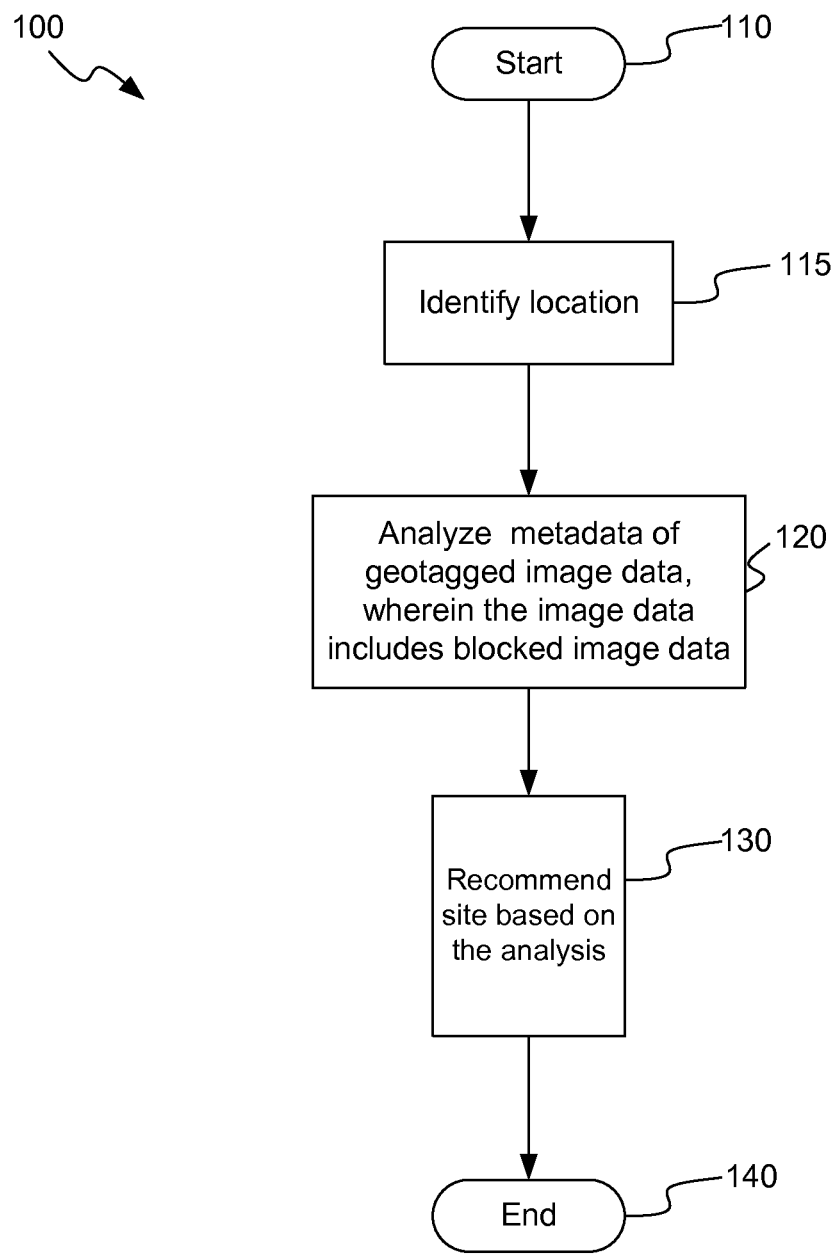
FIG. 1 is a block diagram of an example of a method of recommending sites according to an embodiment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Turning now to FIG. 1, a method 100 of recommending sites according to an embodiment is shown. The method 100 may be performed using a device having computing functionality (e.g., server, workstation, desktop computer, personal digital assistant/PDA, notebook computer, smart tablet, global positioning system (GPS) navigation system), communications functionality (e.g., wireless smart phone), imaging functionality, media playing functionality (e.g., smart television/TV), or any combination thereof. Block 110 indicates the start. At block 110, a user may, for example, access a program that may compute a route between a starting point and a destination point. Examples of such programs include GPS navigation programs, online map generation sites, and so forth.

At block 115, the location of a device user and/or locations along a route between a starting point and a destination point may be identified. Optionally, the location of the user may be identified using a GPS device or a device having GPS functionality incorporated into that device. If a GPS device is used to identify location, a route to the destination may optionally be calculated using the identified initial GPS coordinates. Alternatively, the user may specify an address or alternative GPS coordinates as the starting point.

At illustrated block 120, an analysis of metadata of geotagged images is performed. Typically, the geotags of the image metadata are automatically generated without the intervention of the individual who is creating the image. Since the analysis of metadata of geotagged images is to recommend sites to the user, the starting point GPS coordinates, destination coordinates, and coordinates along the route may be used as a basis for the analysis. Using an aggregate number of images taken at a particular GPS location as a measure of popularity, it may be determined that the particular GPS location may be a site of interest to the user. The analysis will take into account the distance of the identified GPS location to the predetermined route between the starting point and the destination. Images may be stored in one or more databases that are remote to a user device and are accessed via a network such as the Internet. The analysis of the metadata of geotagged images may be performed by a local user device or by a remote device with the results being communicated to the local user device.

Because only the metadata of geotagged images is used, illustrated block 120 uses images that have been blocked as part of the metadata analysis. Of particular note is that metadata access is possible for blocked images since metadata analysis does not use the underlying image. Because the underlying image need not be examined, privacy concerns are alleviated. Examples of blocked images include those images marked by the poster as accessible to only certain individuals, password-protected images, images posted to social networking sites, and any other images that are not publicly available for view.

To determine an aggregate number of images taken at a particular GPS location, a clustering analysis may be performed. One type of clustering analysis that may be performed is a grid-based clustering analysis. In the grid-based clustering analysis, a map may be broken up into a grid. Grid segments with the most data points ("hits") are highlighted. The grid size may be shrunk to make a finer distinction among popular sites that may be of interest to a user. By accounting for hit density differentials in neighboring grids, the location of the clusters may be determined.

Another method to determine the aggregate number of images is a radius-based clustering analysis. In this method, a starting point (any point along the determined route) may be used to detect all points within a variable radius of the starting point. The distance between hits may be used to determine clusters.

Following the metadata analysis of block 120, one or more sites may be determined to be of interest based on the number of images found at a GPS location. The GPS location may be determined to be near to the user's location or a location along the route of the user. Therefore, in illustrated block 130, one or more sites may be recommended to the user based on the analysis. That is, the site meets a threshold determination such as a certain number of images taken at or near the site, and the site is near to the route of the user. In this manner, sites that the user may not have known or may not have seen from the route may be recommended as places to visit to the user. In one embodiment, the content of any publicly-available images may be analyzed from the site (or metadata or tags generated by the posters of those images may be analyzed) to inform the user of what is likely to be seen at the recommended site. In another embodiment, the user may choose settings that recommend sites based on categories of what is likely to be seen at the recommended site. Thus, the user can select nature scenes, architectural scenes, views, or events, for example, to be recommended as sites. The illustrated method 100 ends at block 140.

Figure 2:
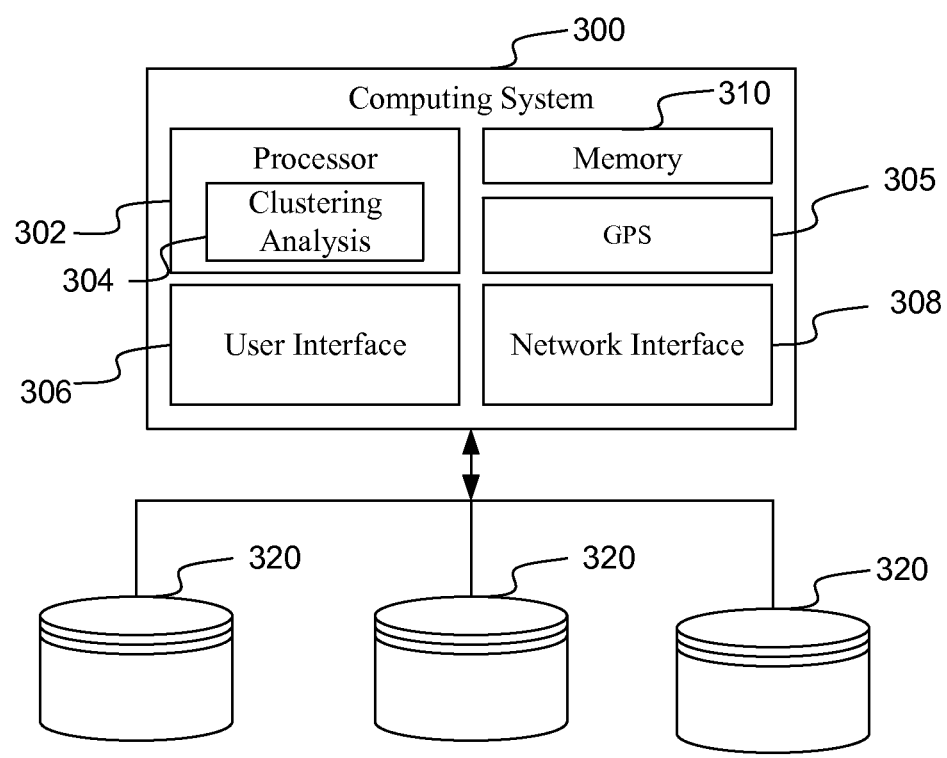
FIG. 2 is a block diagram of an example of a computing system according to an embodiment.

FIG. 2 shows a computing system 300 that may be used to recommend sites as described herein. In the illustrated example, the computing system 300 includes a processor 302 that includes a cluster analysis module 304 configured to implement one or more aspects of the method 100 (FIG. 1), already discussed. The computing system 300 further includes memory 310 (e.g., non-volatile memory/NVM, volatile memory) optionally including one or more of local and remote memory. The illustrated computing system 300 also includes a GPS 305, a user interface 306, and a network interface 308 that provides access to a network (not shown) such as the Internet.

The process of block 120 (FIG. 1), that is, the analysis of metadata of geotagged images, may be performed by a clustering analysis module 304 or it may be performed by a remote processor with the results communicated to the computing system 300. One or more remote databases 320 that store geotagged images may be located on the computer network. The illustrated network interface 308 provides access to the remote databases 320 that store geotagged images for performing the metadata analysis. Through the user interface 306, recommended sites from the metadata analysis may be communicated to the user.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A computer program product to recommend sites, the computer program product comprising a non-transitory computer readable storage medium having program instructions embodied therewith, the program instructions executable by a computer to cause the computer to:
   identify a location associated with the computer based on Global Positioning System (GPS) coordinates of the location;
   analyze metadata of geotagged image data, the image data including blocked image data, the blocked image data including non-public image data, wherein analyzing metadata includes performing a clustering analysis of the metadata and the geotagged image data includes GPS coordinates; and
   recommend sites near the identified location based on the results of the metadata analysis.

2. The computer program product of claim 1, wherein the program instructions are executable to cause the computer to perform a clustering analysis on the metadata of the geotagged image data.

3. The computer program product of claim 1, wherein the clustering analysis is a grid-based clustering analysis.

4. The computer program product of claim 3, wherein the clustering analysis is a radius-based clustering analysis.

5. The computer program product of claim 1, wherein the metadata of the geotagged image data is associated with social network information.

6. The computer program product of claim 1, wherein the program instructions are executable to cause the computer to search one or more remote databases for the metadata of the geotagged image data.

7. A method to recommend sites comprising:
   identifying a location associated with a computing device using a processor based on Global Positioning System (GPS) coordinates of the location;
   analyzing metadata of geotagged image data, the image data including blocked image data, the blocked image data including non-public image data, wherein analyzing metadata includes performing a clustering analysis of the metadata and the geotagged image data includes GPS coordinates; and
   recommending sites near the identified location based on the results of the metadata analysis.

8. The method of claim 7, wherein the clustering analysis is a grid-based clustering analysis.

9. The method of claim 7, wherein the clustering analysis is a radius-based clustering analysis.

10. The method of claim 7, wherein the metadata of the geotagged image data is associated with social network information.

11. The method of claim 7, wherein suggesting sites includes providing information about events or views associated with the sites.

12. A computer program product to recommend sites, the computer program product comprising a non-transitory computer readable storage medium having program instructions embodied therewith, the program instructions executable by a computer to cause the computer to:
    identify a location associated with the computer;
    analyze metadata of geotagged image data, the image data including blocked image data, the blocked image data including non-public image data; and
    recommend sites near the identified location based on the results of the metadata analysis.

13. The computer program product of claim 12, wherein the program instructions are executable to cause the computer to perform a clustering analysis on the metadata of the geotagged image data.

14. The computer program product of claim 13, wherein the clustering analysis is a grid-based clustering analysis.

15. The computer program product of claim 13, wherein the clustering analysis is a radius-based clustering analysis.

16. The computer program product of claim 12, wherein the metadata of the geotagged image data is associated with social network information.

17. The computer program product of claim 12, wherein the program instructions are executable to cause the computer to search one or more remote databases for the metadata of the geotagged image data.

18. The computer program product of claim 12, wherein the program instructions are executable to cause the computer to identify the location based on a GPS device associated with the computer.

19. The computer program product of claim 18 wherein the program instructions are executable to perform a clustering analysis using the identified location based on the GPS device compared with GPS location information in the metadata.

20. The computer program product of claim 12, wherein the program instructions are executable to cause the computer to provide information about events or views associated with the recommended sites.

21. The computer program product of claim 20 wherein the information about events or views associated with the recommended sites is obtained from unblocked image data.

\* \* \* \* \*